United States Patent Office 3,150,022
Patented Sept. 22, 1964

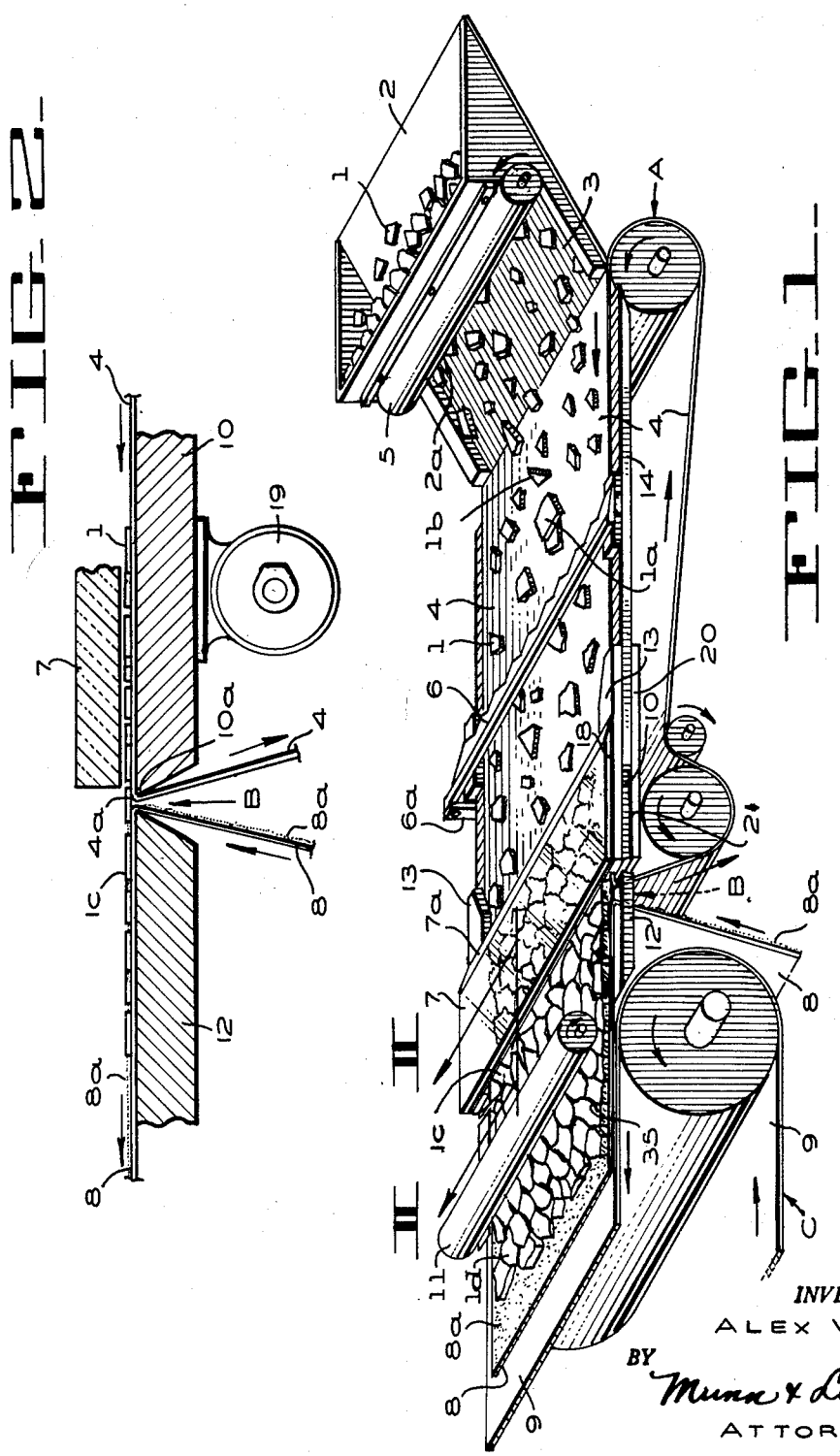

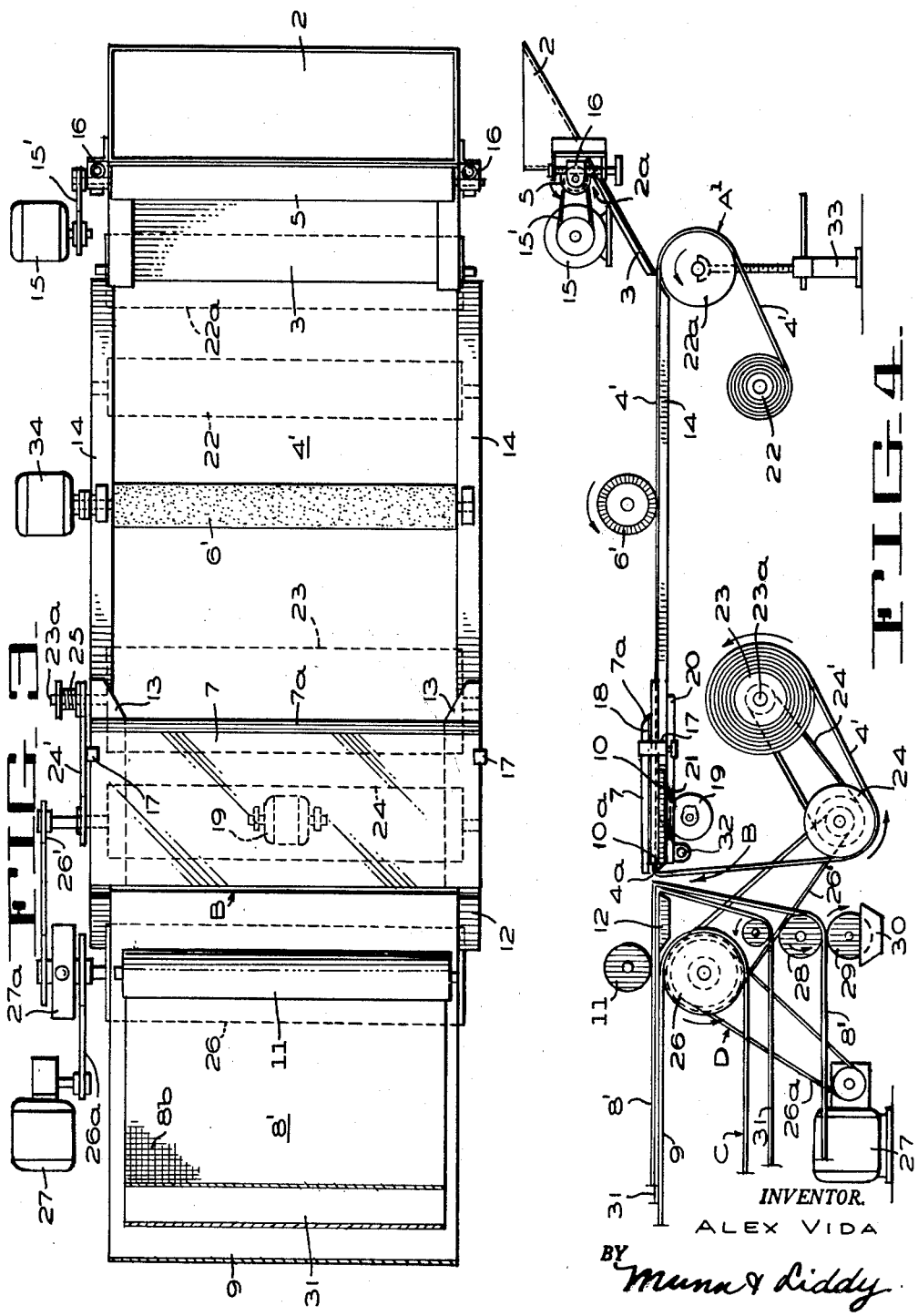

3,150,022
CONTINUOUS PROCESS AND APPARATUS FOR THE MANUFACTURE OF MOSAIC SHEETS
Alex Vida, 537 Kansas St., San Francisco, Calif.
Filed Jan. 4, 1961, Ser. No. 80,706
16 Claims. (Cl. 156—73)

The present invention relates to improvements in a continuous process and apparatus for the manufacture of mosaic sheets. It consists of the steps of the process, and the combinations, constructions and arrangement of the parts of the apparatus, as hereinafter described and claimed.

This invention has particular reference to improvements over the method and apparatus shown in my United States Patent No. 2,949,689, dated August 23, 1960.

Broadly stated, the present invention is particularly concerned with the forming of a continuous sheet of mosaics which may be cut to suitable sizes.

An object of this invention is to provide a process and apparatus for continually gluing materials suitable for forming mosaics to paper, cloth, or other appropriate backing sheet, in tight uniform distribution, this operation taking place in a substantially flat or slightly inclined plane.

More specifically stated, it is proposed to advance edgewise a single layer of spaced-apart mosaic-forming inlay pieces, these inlay pieces being advanced in a preselected plane. As these inlay pieces are advanced, they are subjected to a raking or brushing action to assure the fact that all of them are disposed in the same plane. Then the inlay pieces are bunched into adjacent relation with one another to provide a substantially uniform distribution of the inlay pieces over an area, the advancing inlay pieces can be vibrated as they are bunched together, thereby causing them to pack more tightly.

Moreover, the advancing inlay pieces are pushed across a narrow gap, whereby small inlay pieces and dust therefrom will drop through the gap and thus be separated from usable inlay pieces. Finally the bunched inlay pieces are bonded to a glue-coated paper, cloth or other backing sheet, as they are advanced.

Other objects and advantages will appear as the specification continues. The novel features of the invention will be pointed out in the appended claims.

Drawings

With the objects broadly stated, a more complete description of the invention will be obtained when the following specification is read in conjunction with the accompanying drawings, in which:

FIGURE 1 is an isometric view of one embodiment of my improved apparatus wherein the steps of the continuous process may be carried out;

FIGURE 2 is an enlarged longitudinal sectional view taken along the vertical plane II—II of FIGURE 1;

FIGURE 3 is a top plan view of another form of the apparatus and shows additional details; and FIGURE 4 is a side elevational view of the apparatus disclosed in FIGURE 3.

While I have shown only the preferred forms of my invention, it should be understood that various changes, or modifications, may be made within the scope of the annexed claims without departing from the spirit thereof.

Detailed Description

Referring to FIGURE 1, mosaic-forming pieces 1 are placed in a hopper 2 where they descend by gravity and pass through an outlet slot 2a to an inclined trough 3. Then these pieces will slide down the trough to the upper reach of a moving belt 4 of a feed conveyor A, where they will be positively advanced. The outlet slot 2a is provided between a roller 5 and the inclined trough 3. The rate of flow of the chips 1 from the hopper 2 is controlled by the speed of rotation of the roller 5 and by the height of the slot 2a. This roller may be adjusted vertically so as to regulate the size of the slot 2a, as will be described in greater detail in connection with FIGURE 4. The inlay pieces 1 may be glass or ceramic chips, but I do not wish to be limited to the material used.

It is obvious that other means of feeding the inlay pieces to the belt 4 can be used, if they provide means for controlling the flow of these inlay pieces.

The spaced-apart inlay pieces 1 are advanced edgewise by the belt 4 in a substantially horizontal or inclined plane in a planular stream, under a serrated bar 6 which is provided with an oscillatory movement. This bar is mounted to extend above and across the upper reach of the belt 4 of the feed conveyor A; it is used to allow a single layer of inlay pieces 1 to pass edgewise beneath it, and the distance between the bar 6 and the upper reach of the belt 4 is set accordingly. Any suitable means may be used to oscillate the bar 6, such as an oscillating arm 6a.

When overlapping inlay pieces 1a, or inlay pieces 1b standing on end, come in contact with the oscillating serrated bar 6 they are raked into the same flat plane as other spaced-apart inlay pieces that pass beneath the bar. Although only one such bar is shown, more than one can be used and the others may be of different design. Thus, if one serrated bar 6 fails to rake all of the inlay pieces into a single plane, the next bar or bars would accomplish the desired result.

While some of the inlay pieces 1 are being arranged in a single plane by the bar 6, other inlay pieces that have passed under this bar are being moved forwardly by the belt 4 under a plate 7 which is preferably made of thick glass or other transparent material, and may be bevelled at 7a as shown. This plate is also positioned to allow a single layer of the inlay pieces to advance edgewise beneath it. The plate 7 will confine inlay pieces to a single layer and allow a larger grouping of the inlay pieces to form beneath it. For best results, the distance from the top of the belt 4 to the underside of plate 7 should be set as closely as possible to allow a single layer of inlay pieces to pass beneath it without touching this plate.

When the front inlay pieces are advanced by the belt 4, they come to the front end 4a of the feed conveyor A and are pushed across a narrow gap B (see FIGURE 2), where they come into contact with the glue-coated paper or cloth 8, or other suitable backing sheet. This paper, cloth or backing sheet is pulled by the upper reach of a belt 9 of a transfer conveyor C over a plate 12 in the same direction as the inlay pieces are travelling, but at a slower rate of speed than the belt 4. Dust and smaller particles of the inlay pieces that will not bridge the gap B are separated by falling through this gap.

As a result, when the front inlay pieces come into contact with the glued paper, cloth or backing sheet 8, they are held by the glue 8a on the backing sheet and are slowed down in their forward movement. However, the belt 4 is travelling at a faster rate of speed and it will slide under the restrained leading inlay pieces 1c and advances the unrestrained spaced-apart rear or trailing inlay pieces, latter being drawn into contact with the restrained forward inlay pieces. This results in the formation of a group of tightly packed inlay pieces 1d (see left-hand portion of FIGURE 1). The inlay pieces are also confined by side guide bars 13 which are arranged along the opposite lateral edges of the upper reach of the belt 4. The guide bars 13 determine the width of the forward moving stream of inlay pieces, resulting in the formation of a group of closely packed inlay pieces.

These tightly packed inlay pieces 1d are being constantly advanced edgewise toward and onto the glued paper, cloth or backing sheet 8 by the forward sliding friction of the belt 4 under them. Since the backing sheet 8 is drawn by the belt 9 and moves at a slower rate of speed than the belt 4, groups of inlay pieces 1d are being constantly reformed as they are drawn away in tightly packed formation by the backing sheet 8 to which they adhere.

This process can be compared to one occurring in nature. When pieces of ice or debris floating down a faster moving stream meets an obstruction, or a slower moving stream, they are bunched together by the stream flowing under them; and, as they are being constantly pushed into the slower moving stream in packed formation, these pieces of ice or debris repack upstream.

Inasmuch as the belt 4 extends downwardly through the gap B in adjacent relation with the upwardly extending backing sheet 8, the belt 4 will carry and urge the advancing inlay pieces directly into contact with the glue 8a on the upper surface of the backing sheet. This glue will grab and pull the inlay pieces across the gap B. Any small inlay pieces or dust dropping through the gap B will not leave voids in the packed group of inlay pieces 1d, because the belt 4 is travelling at a higher rate of speed than the belt 9 of the transfer conveyor C.

As the inlay pieces are being advanced edgewise by the belt 4, they are restrained from also being pushed upward by the plate 7 and, therefore, are held in a flat plane. This more clearly shown in FIGURE 2. The position of the plate 7 can be other than that shown, and may be moved forward or back to suit the best operating conditions. The plate 7 is removable in the unlikely event that the inlay pieces should jam beneath it.

Since it is important to the finished product to have the inlay pieces packed in as tight uniform distribution as possible, a vibrator 19 may be attached to an apron 10 over which the belt 4 passes (see FIGURE 2). The apron 10 supports the front end of the belt 4 and is under the plate 7. This vibrating action will be transmitted to the inlay pieces and cause them to pack more tightly.

After the inlay pieces have been glued to the backing sheet 8, they are pulled forward by the belt 9 of the transfer conveyor C and pass under a roller 11, which applies pressure to the top of the inlay pieces and presses them down into the glue 8a. Additional rollers (not shown) may be used in a similar way to increase the bond and further flatten the inlay pieces into a plane. These rollers may be made of different materials, such as steel or rubber-coated as required to accomplish the best results.

The belt 4 should be thin in order to accomplish the best results, and should be made of a material that can be spliced flat, if an endless type belt is used for the feed conveyor A as in FIGURE 1. It should have a smooth finish so that it will readily slide over the apron 10 and under the inlay pieces when they are restrained. Moreover, the belt should be thin and strong to prevent it from creasing, when being pulled over the forward edge 10a of the apron 10 (see FIGURE 2).

It should be noted that the feed conveyor A is not restricted to the endless type of belt 4 shown in FIGURE 1. In this connection, a modified feed conveyor A¹ has been disclosed in FIGURES 3 and 4, showing a supply reel 22 of a suitable belt 4'. After passing over a rear roller 22a and under the glass plate 7, the belt 4' extends downwardly through the narrow gap B, and thence under a roller 24 to a rewind front reel 23. The advantages of this arrangement are that very thin plastic materials can be used for the belt 4'; this in turn will allow sharper bends over the forward edge 10a of the apron 10; and results in closer adjustments of the gap B bridged by the usable inlay pieces. Moreover, there are no splicing problems as would be encountered in the use of an endless belt, and the wear on the belt 4' would be distributed over a very large area.

As shown in FIGURES 3 and 4, a motor 27 is used as a rear drive for the belt 9 of the transfer conveyor C. This same motor can be used to power the belt 4' of the feed conveyor A¹ through the use of a belt or chain drive mechanism D, and through the best selection of pulleys or sprockets to obtain the desired proportional speed between belts 4' and 9. A variable speed device 27a may be used to provide further control and adjustments in the proportional speeds of the belts 4' and 9. It will be understood, of course, that a similar drive mechanism may be used for actuating the belts 4 and 9 in FIGURE 1.

It will be noted that the belt 4' is drawn from the rear supply reel 22 by the roller 24, and is rewound on the front reel 23. The latter is rotated by a belt or chain drive 24'. A slip clutch device 25 is provided on a shaft 23a of the rewind reel 23, and it can be adjusted to maintain an even tension on the belt 4' as the latter is being rewound. The roller 24 is also connected by a belt or chain drive 26' to a roller 26 around which the belt 9 passes. The motor 27 drives the roller 26 through a belt or chain drive 26a.

While FIGURES 1 and 2 illustrate a backing sheet 8 having glue 8a thereon, I make use of a different type of backing sheet 8' in FIGURES 3 and 4. Here, the backing sheet 8' is pulled by the belt 9 against a roller 28, and is coated with glue by a roller 29 which picks up and transfers the glue from a trough 30. Adjusting the upward pressure of the roller 29 will regulate the thickness of the glue transferred. Other methods (not shown) for applying different types of glue or adhesive may be used. If an open mesh cloth is used for the backing sheet 8', as suggested by the hatching 8b in FIGURE 3, the glue applied to such a backing sheet can be prevented from adhering to the belt 9 by using wax coated paper or plastic sheet separator 31 between the glued sheet 8' and the belt 9. In some instances, paper or cloth supplied with pressure sensitive coatings may be used, either in FIGURES 1–2 or 3–4.

Although the inlay pieces 1 used to form the mosaics are shown as being flat, I do not wish to be limited to these shapes. Mosaics made from other materials, such as pebbles or crushed rock, also can be used to advantage in this process and on the above described apparatus.

In the operation of this process it is important that the rate of flow of the inlay pieces 1 from the hopper 2 be controlled with relation to the speed of the moving belts 4 or 4'. If the inlay pieces are fed too fast from the hopper 2, they will back up under the glass plate 7, and too much pressure will be exerted on the front inlay pieces as they are being advanced onto the backing sheets 8 or 8', and this will cause some of the inlay pieces to be pushed upward and out of alignment.

On the other hand, if the inlay pieces 1 are fed too slowly from the hopper 2, they will not group together properly under the glass plate 7 and spacious voids will be formed as they are glued to the backing sheet.

An additional adjustment to the best grouping of the inlay pieces 1 can be provided by raising or lowering the back of the feed conveyor A¹ (or A) about a pivoted support 32 (see FIGURE 4) so that the belt 4' (or 4) carrying the inlay pieces is in an inclined position instead of horizontal, as shown. For this purpose, I have disclosed a conventional jack 33, although any other suitable lifting and lowering means may be employed for accomplishing the result.

If the back end of the feed conveyor A¹ (or A) is raised, the forward movement of the inlay pieces 1 carried by the belt 4' (or 4) will be aided by gravity. This will pack the inlay pieces more tightly and exert more pressure on the inlay pieces. On the other hand, if the back end of the feed conveyor A¹ (or A) is lowered, less pressure will be exerted on the front inlay pieces, and a larger grouping of closely packed inlay pieces can be expected, without exerting excessive pressure on the front inlay pieces.

Upon examining the above descriptions it will be apparent that I have shown three distinct methods of controlling the grouping of the inlay pieces at the front end 4a of the belt 4' (or 4). These include methods for adjusting the rate of feeding of the inlay pieces to the belt 4' (or 4); means for regulating the proportional speeds of the belts 4' (or 4) and 9; and the effect on the grouping of the inlay pieces resulting from the placing of the belt 4' (or 4) in inclined planes.

As previously stated, FIGURES 3 and 4 disclose additional details of the apparatus used in carrying out the invention, and illustrate features that could be incorporated in FIGURES 1 and 2.

In FIGURES 3 and 4, the inlay pieces are placed in the hopper 2, as previously described. The means for controlling the rate of flow of the inlay pieces through the outlet slot 2a include varying the speed of a motor 15 which turns the roller 5 through a suitable belt or chain drive 15'. A further adjustment can be made by raising or lowering the roller 5 by means of screw take-up bearings 16, which changes the height of the outlet slot 2a beneath this roller.

The inlay pieces then descend by gravity down the inclined trough 3 onto the moving belt 4' (or 4) which is supported by a plate 14. In FIGURES 3 and 4, the inlay pieces deposited on the moving belt 4' are carried under a rotating brush 6' that is driven by a motor 34. This brush moves overlapping inlay pieces back onto the belt 4' so as to deposit them between spaced-apart inlay pieces. The brush 6' performs the same function as the serrated bar 6 as previously described.

With reference to FIGURES 3 and 4, the glass plate 7 is shown as being removably secured to the supporting plate 14 and guide bars 13 by clamps 17. The clearance beneath the glass plate 7 and the belt 4' (or 4) can be adjusted by using one or more layers of adhesive tape 18, or other suitable shims.

The vibrator 19 has been shown as being fastened to the underside of the apron 10, the latter being supported by bars 20 which in turn are permanently fastened to the plate 14. A rubber cushion 21 is used between the apron 10 and the bars 20 to confine the vibration to this apron.

If pebbles or other materials with varying shapes and thicknesses are used to form mosaics in the manner described, glass plate 7 may be removed if it offers no advantage in aiding the best grouping of these irregular shaped mosaic pieces. The vibrator 19 can also be omitted under some circumstances if it does not prove to be beneficial to the desired results.

The mosaic sheets thus produced will have grouting spaces 35 disposed between adjacent inlay pieces, since the latter are irregular in outline and will touch each other at some points and will remain spaced at other points. The methods used for applying these mosaic sheets to a wall or other suitable support are similar to those used for other mosaics and are well known to the trade. One such method is illustrated in my United States Patent No. 2,949,689. A reverse method can also be used if the mosaic pieces are glued to a cloth backing with a permanent type of adhesive. In this instance the cloth backing is permanently fastened to the wall by embedding it into the bonding and grouting material.

I claim:

1. In the continuous process for the manufacture of mosaic sheets, the steps of: advancing a single layer of spaced-apart inlay pieces of the same thickness but of irregular shapes edgewise in a horizontal plane; moving any overlapping inlay pieces and inlay pieces standing on end into the same horizontal plane as the other spaced-apart inlay pieces; bunching the advancing inlay pieces into adjacent abutting relation with one another to provide a substantially uniform distribution of the inlay pieces over an area as a mosaic, and maintaining them in a substantialy horizontal plane while they are being bunched; and securing a backing sheet to the bunched inlay pieces while they are being advanced.

2. The continuous process for the manufacture of mosaic sheets, as defined in claim 1; and in which the inlay pieces are vibrated as they are being bunched together, thereby causing them to pack more tightly.

3. In the continuous process for the manufacture of mosaic sheets, the steps of: advancing a single layer of spaced-apart inlay pieces edgewise in a plane; bunching the advancing inlay pieces into adjacent relation with one another to provide a substantially uniform distribution of the inlay pieces over an area, and maintaining them in a plane while they are being bunched; pushing the inlay pieces across a narrow gap, whereby small non-useable inlay pieces and dust will drop through the gap and thus be separated from useable inlay pieces; and securing a backing sheet to the useable bunched inlay pieces while they are being advanced.

4. In the continuous process for the manufacture of mosaic sheets, the step of: advancing bunched inlay pieces across a narrow gap, whereby small non-useable inlay pieces and dust will drop through the gap and thus be separated from useable inlay pieces.

5. In the continuous process for the manufacture of mosaic sheets, the steps of: advancing a single layer of spaced apart inlay pieces in a horizontal planular stream; and slowing down the forward movement of leading inlay pieces in the horizontal stream, while advancing unrestrained trailing inlay pieces in the stream, whereby the trailing inlay pieces are bunched against the restrained leading inlay pieces to form a group of tightly packed inlay pieces; and in securing a backing sheet to the bunched inlay pieces while the pieces are moving.

6. The continuous process for the manufacture of mosaic sheets, as defined in claim 5; and in which the inlay pieces are vibrated as they are being bunched together, thereby causing them to pack more tightly.

7. The continuous process for the manufacture of mosaic sheets, as defined in claim 5; and in which the bunched inlay pieces are advanced across a narrow gap, prior to being secured to the backing sheet, whereby small non-useable inlay pieces and dust will drop through the gap and thus be separated from useable inlay pieces.

8. In an apparatus for the manufacture of mosaic sheets: a feed conveyor having a movable belt positioned in a substantially horizontal plane to receive spaced-apart inlay pieces; means operable for moving the belt of the feed conveyor to advance the inlay pieces edgewise in a planular stream; means operable for moving overlapping inlay pieces and inlay pieces standing on end into the same plane as the other spaced-apart inlay pieces; and a plate extending transversely across the belt of the feed conveyor and being spaced thereabove at a distance so that only a single layer of the inlay pieces may pass edgewise beneath the plate.

9. The apparatus for the manufacture of mosaic sheets, as defined in claim 8; and in which a transfer conveyor is provided, which has a belt positioned to receive inlay pieces from the belt of the feed conveyor; and means for moving the belt of the transfer conveyor in the same direction as the belt of the feed conveyor, but at a slower rate of speed, whereby the faster moving inlay pieces on the feed conveyor belt will bunch against the slower moving inlay pieces on the transfer conveyor, thereby forming a group of bunched inlay pieces on the feed conveyor belt; and means for securing a backing sheet to the bunched inlay pieces as they are moved onto the belt of the transfer conveyor.

10. The apparatus for the manufacture of mosaic sheets, as defined in claim 9; and in which a vibartor is provided for vibrating the inlay pieces as they are being bunched together, thereby causing them to pack more tightly.

11. The apparatus for the manufacture of mosaic sheets, as defined in claim 9; and in which a narrow gap is provided between adjacent ends of the belts of the feed and transfer conveyors, and over which the advancing chips are pushed, prior to being secured to the backing sheet, whereby small non-useable inlay pieces and dust will be separated from the useable inlay pieces.

12. In an apparatus for the manufacture of mosaic sheets: a feed conveyor having a movable belt positioned to receive spaced-apart mosaic pieces; means operable for moving the belt of the feed conveyor to advance the inlay pieces in a planular stream; a transfer conveyor having a belt positioned to receive inlay pieces from the belt of the feed conveyor; means for moving the belt of the transfer conveyor in the same direction as the belt of the feed conveyor, but at a slower rate of speed, whereby the faster moving inlay pieces on the feed conveyor belt will bunch against the lower moving inlay pieces on the transfer conveyor belt, thereby forming a group of bunched inlay pieces on the feed conveyor belt; the adjacent ends of the feed and transfer belts being spaced apart to define a narrow gap over which the bunched inlay pieces are pushed, whereby small non-useable inlay pieces and dust will be separated from the useable inlay pieces; means for moving a glue-coated backing sheet upwardly through the gap, with the glue being disposed to bond against the bunched inlay pieces on the transfer conveyor belt; the belt of the feed conveyor extending downwardly through the gap in adjacent relation with the glue-coated backing sheet, whereby the feed conveyor belt will carry and urge the advancing inlay pieces directly into contact with the glue on the packing sheet.

13. The apparatus for the manufacture of mosaic sheets, as defined in claim 12; and in which a variable speed device is provided to control the proportional speeds of the feed conveyor and transfer conveyor belts.

14. The apparatus for the manufacture of mosaic sheets, as defined in claim 12; and in which means are provided for depositing the mosaic pieces on a rear end of the feed conveyor belt; and in which adjustable means are provided to change the inclination of the feed conveyor belt in either direction from a substantially horizontal plane, whereby the pressure exerted on the front inlay pieces during the packing thereof by the advancing trailing inlay pieces may be adjusted.

15. In an apparatus for the manufacture of mosaic sheets: a supporting plate having front and rear ends; an apron supported by the front end of the plate and being provided with a forward edge; a feed conveyor belt defining a strip of flexible material; the feed conveyor belt having a rear section extending downwardly over the rear end of the plate, and a front section extending downwardly over the forward edge of the apron; the feed conveyor belt having a reach supported by the plate; the belt being of a considerable length so that the wear on the belt can be distributed over a large area; a rear supply reel upon which the feed conveyor belt may be initially wound; a front rewind reel to which a front section of the feed conveyor belt is secured; means operable for drawing the feed conveyor belt from the rear supply reel over the plate and apron, and for winding the feed conveyor belt upon the rewind reel; and means for depositing mosaic pieces on a rear part of the belt for advancement by the belt.

16. In an apparatus for the manufacture of mosaic sheets, as defined in claim 15; and in which the feed conveyor belt is made of a strong thin material that may be drawn over the forward edge of the apron without creasing; and a vibrating means operatively connected to said apron for vibrating it for lessening the friction of said belt on said apron as said belt is drawn over the forward edge of said apron.

References Cited in the file of this patent

UNITED STATES PATENTS

| | | |
|---|---|---|
| 2,318,215 | Gans | May 4, 1943 |
| 2,828,794 | Baumann | Apr. 1, 1958 |
| 2,949,689 | Vida | Aug. 23, 1960 |
| 3,007,577 | Putman | Nov. 7, 1961 |
| 3,012,901 | Reese | Dec. 12, 1961 |
| 3,038,605 | Durand | June 12, 1962 |